United States Patent [19]
Burnett

[11] Patent Number: 4,902,177
[45] Date of Patent: Feb. 20, 1990

[54] RAPID CHANGE TOOL CUTTER AND DRIVING SYSTEM

[75] Inventor: Lauren W. Burnett, Blue Springs, Mo.

[73] Assignees: Terry K. Aitkens, Lee's Summit, Mo.; Emmett A. Yates, Leawood, Kans.

[21] Appl. No.: 263,418

[22] Filed: Oct. 27, 1988

[51] Int. Cl.$^4$ .......................... B23B 31/20; B23B 5/26
[52] U.S. Cl. ..................................... 409/234; 279/1 B; 279/48; 408/240
[58] Field of Search .................. 409/231, 232, 234; 279/1 B, 1 L, 1 TS, 48, 52, 56, 59; 408/240

[56] References Cited

U.S. PATENT DOCUMENTS

| | | | |
|---|---|---|---|
| 657,432 | 9/1900 | Melzer | 279/48 X |
| 1,867,296 | 7/1932 | Woodruff | 279/48 X |
| 2,336,095 | 12/1943 | Heding | 279/79 |
| 2,773,693 | 12/1956 | Chittenden | 279/48 |
| 2,890,072 | 6/1959 | Kaman et al. | |
| 2,939,643 | 6/1960 | Barsam, Jr. | 242/55.11 |
| 3,759,336 | 9/1973 | Marcoritz et al. | 279/1 B X |
| 3,958,809 | 5/1976 | Child | 279/1 L |
| 4,135,848 | 1/1979 | Hughes et al. | 408/239 A |
| 4,303,360 | 12/1981 | Cayen et al. | 409/233 |

FOREIGN PATENT DOCUMENTS 628639 4/1936 Fed. Rep. of Germany ........ 279/48

OTHER PUBLICATIONS

"Universal Collet Chuck with Quick Change System" Rego-Fix AG Swiss Tool Maker brochure Jun. 1976.

Primary Examiner—Z. R. Bilinsky
Attorney, Agent, or Firm—Thomas M. Scofield

[57] ABSTRACT

Improvements in tool holders in the field of machine tools; quick change connectors for replacing one tool holder with another in chucks mounted on rotary machine tool drive shafts and spindles; tool changing attachment permitting rapidly changing or switching one drilling, cutting or milling tool holder or collet for another involving removably engaging connectors employing mere operator hand force in effecting engaging or disengaging of the collets or tool holding adapters with the driving chuck; employing a coil compression spring as a locking element in tool holding apparatus between a chuck and a tool carrying collet, the spring captured in compressive engagement between bearing surfaces carried by the chuck and the collet, one such bearing surface provided in a nut threading on the chuck operable to hold and force the spring against a bearing surface on the collet.

12 Claims, 2 Drawing Sheets

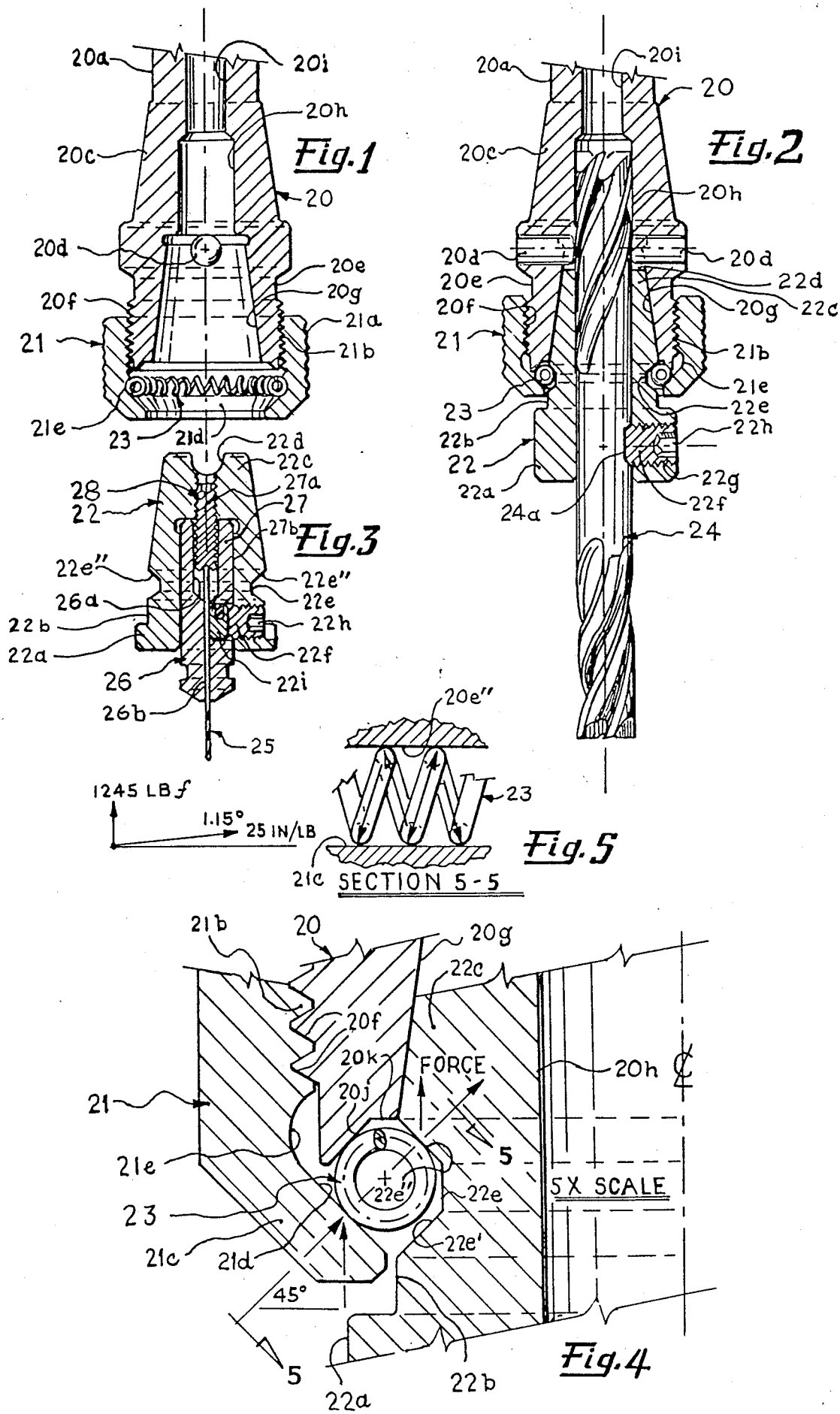

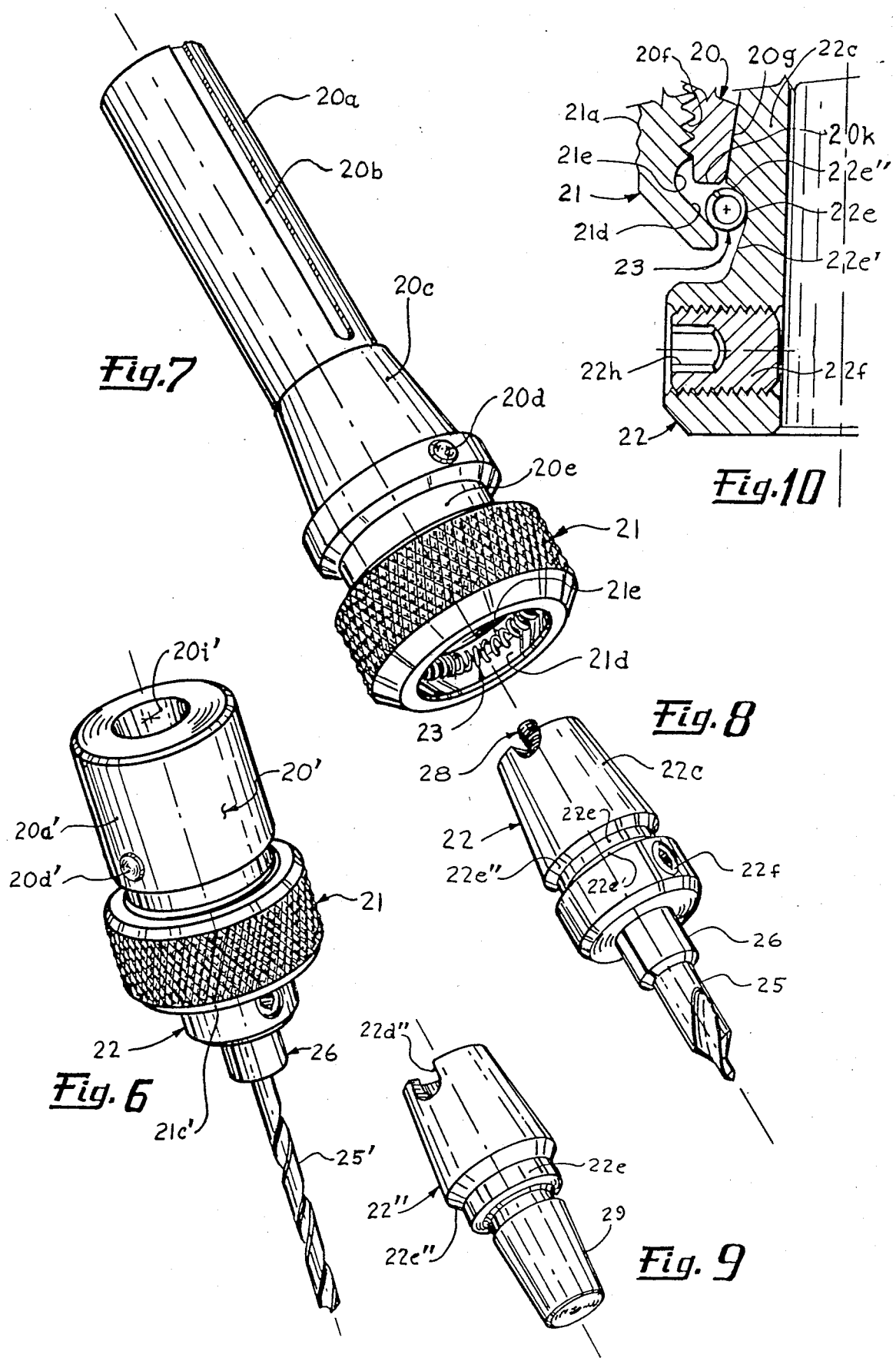

RAPID CHANGE TOOL CUTTER AND DRIVING SYSTEM

BACKGROUND OF THE INVENTION

The subject invention relates in general to the field of machine tools and tool holder clamps for clamping a tool holder in the tool holder socket on the outer end of a machine tool spindle. Said otherwise, this invention relates to spindles for power tools and, more particularly, to unique retaining and releasing collet chucks, collets and quick change adapters received and released by such rotary tool spindles, whereby such named devices have been substantially improved in their engagement with various tool work members removably engaged thereby.

The subject development particularly is directed to a unique tool changing means which allows a metal working machine operator, performing work such as drilling or light milling, to rapidly change (or switch) from one cutting tool to another without losing a pre-set length of any of the series of cutting tools the operator may require for a particular production (or repetitive) machine set up. The subject system is optimally intended for use in machining operations in the two horse power or less range of operation, although machining operations utilizing greater power would also benefit from this new construction.

While those familiar with the art are aware that other systems exist which address the same problem, the optimum features of the subject development are not found therein. What is now desired and needed in this particular art may be defined as follows:

(1) Such a tool changing device, preferably for use in machining operations in the two horse power or less range of operations, which is very, very compact, thus allowing the shortest distance from the cutting tool working end to the spindle bearing, such available as an externally installed device;

(2) The rigidity of the locking method employed by the tool changing means should allow both (a) the use of drilling means without use of drill guide bushings and, further, (b) sufficient rigidity permitting use of milling cutters with a high side thrust capability;

(3) Various pre-set tool drivers should be able to be rapidly changed by simply rotating a knurled nut clockwise approximately one turn by hand (with absolutely no need of any type of wrench), whereby to readily extract the tool holding driver or collet from the body or universal collet chuck which remains on (or in) the machine spindle.

(4) A different pre-set tool should be able to be installed by simply inserting the new or different tool holding driver or collet into the body or chuck remaining in or on the machine spindle, rotating such slightly to engage the drive pins, thereafter contra-rotating the said knurled nut approximately one turn, whereby to fully and effectively engage the driver to the seat and the body or chuck. No wrench should be needed.

(5) Such tool changing system should be able to be furnished to the machine tool industry for use with any one of the popular spindle nose mounting configurations which are integral to the body, such as R-8 (Bridgeport) and all Jacobs tapers, whereby the device is able to be installed in less than one minute of the operator's time.

SPECIFIC PRIOR ART SYSTEM

There is known to the art and available to the industry the universal collet chuck (with quick change system) which is manufactured by Rego-Fix AG, tool manufacturers of Switzerland. The specific system here being referred to is entitled "Universal Collet Chuck With Quick Change System", apparently (by numbering on the brochure) published circa June, 1976. Reference is here made to the cover thereof, page 2 thereof and, particularly, example 5 given at the bottom of page 7 thereof. Applicants have but one copy of this brochure (8 total foldout pages), a copy of which will be supplied to the Examiner with the prior art listed herebelow.

On page 2 of this brochure, under "Universal Collet Chucks Rego-Fix", there is seen a set of bodies or universal collet chucks (particularly examples 3-8, inclusive), thereafter and therebelow are shown application tools and a thread-on nut (for each of said bodies) 25a and 26. Further, therebelow, (27-32) there is shown a set of stub shank drivers with hexagonal bases thereon (at the top of the view) which are engaged by the nuts 25 or 26 with the bodies 3-8, inclusive. Sets of typical useable tools and tool holders to be received and held by such drivers are shown therebelow (largely unnumbered except 28a).

With respect to the noted Rego-Fix system, which is produced in Switzerland, and to applicant's knowledge has at least some marketing in the United States, applicant has used such system and is cognizant of its features:

(1) The Rego-Fix system is intended primarily for heavy machining operations and is quite expensive due to the hexagonal stub driving feature;

(2) The Rego-Fix method of tool driver locking comprises a Torus ring with a 10° to 20° gap cut out of such, whereby to allow radial expansion and retraction thereof in application and removal of the drivers, collets or adapters (27-32; inclusive to and from the bodies or collet chucks (3-8, inclusive);

(3) The Rego-Fix solid, gapped, Torus ring provides a somewhat analogous engaging and locking action as the applicant's inventive, subject, disclosed circular compression spring, but is not itself in any way (or by any possibility) resilient. Therefore, as locking surfaces in the Rego Fix members impinge upon the Rego-Fix Torus ring, only minute points of contact are or can be accomplished, due to omnipresent surface irregularities on the outside surface of the ring;

(4) As a result of the above, a long handled spanner wrench (see wrench opposite nut 26 on P2 of the Rego Fix brochure) must be used in the Rego-Fix system for engaging the locking nut and very considerable torque must be applied to assure proper lock-up of the parts and no loosening of such in operation due to tool vibration;

(5) As just described, the reverse procedure and same spanner wrench must be used in order to remove or change a cutting tool driver in the Rego Fix system;

THE PRIOR ART

In addition to the Rego-Fix AG disclosure/publication referred to in detail above, applicant is aware of the following United States Patents which are related to methods of and apparatus for changing tool holders in machine tools.

Heding 2,336,095 "Quick Change Chuck", issued Dec. 7, 1943;

Kaman et al U.S. Pat. No. 2,890,072 "Retainer For Rotary Power Tools", issued June 9, 1959;

Barsam, Jr., U.S. Pat. No. 2,939,643 "Removable Spindle Rewind Mechanism", issued June 7, 1960;

Marcovitz et al U.S. Pat. No. 3,759,336, issued Sept. 18, 1973 for "Interchangeable Power Operated Tools";

Hughes, et al U.S. Pat. No. 4,135,848 "Tool Holder Clamp For Machine Tools", issued Jan. 23, 1979; and Cayen U.S. Pat. No. 4,303,360, issued Dec. 1, 1981 for "Power Drawfinger System For Machine Tool Spindle".

OBJECTS OF THE INVENTION

A first object of this invention is to provide a new and unique tool changing means which allows a metal working machine operator to rapidly change (or switch) from one cutting tool to another without losing a pre-set length of any of the series of cutting tools the operator may require for a particular production (or repetitive) machine setup.

Another object of the invention is to provide a new tool changing apparatus, means and process for the stated use, such particularly and optimally useable in machining operations in the two horse power or less range of operation.

Yet another object of the invention is to provide unique tool changing means for metal working machines (typically drilling and light milling machines) wherein the improvement and construction is extremely compact, thus allowing the shortest distance from the cutting tool end to the spindle bearing, such available as an externally installed device.

Still another object of the subject invention is to provide a locking method for tool changing means in metal working machines wherein the rigidity thereof allows the use of drilling tools without the necessary use of drill guide bushings, as well as sufficient rigidity for the use of milling cutters with high side thrust capability.

Yet another object of the invention is to provide such unique tool changing means for metal working machines such as drill presses and milling units wherein various pre-set tool drivers may be most rapidly changed, including both removal of the used driver and replacement of the to be used driver without any requirement of any type of wrench.

Another object of the invention is to provide such a tool changing system for metal working machines wherein such can be furnished to the machine tool industry for use with any of the popular available, conventionally used spindle nose mounting configurations integral to the body or collet chucks, for example R-8 (Bridgeport) and all Jacob's tapers such, this improvement permitting new tool installation in less than one minute.

Another object of the invention is improve the manner of attaching universal collet chucks or bodies to the collets or quick change adapters over the Rego-Fix system (described in detail hereabove) in a new and substantially improved manner.

Other and further objects of the invention will appear in the course of the following description thereof.

THE DRAWINGS

In the drawings, which are a part of the instant specification, views of the parts of the assemblies of the subject invention are shown and, in the various views, like numerals are employed to indicate like parts.

FIG. 1 is a vertical section through the lower end of an R-8 drilling shank, such being so modified in itself and with respect to the cooperating threaded nut at the lower end thereof whereby to readily receive and release a collet, adapter or tool holder of the sorts seen (a) engaged with the FIG. 1 shank in FIG. 2 and (b) separate from the (FIG. 1) shank in FIG. 3.

FIG. 2 is a vertical section through an R-8 milling shank (the lower end thereof), as in FIG. 1, such so modified at the lower, inner end thereof as to cooperate in engaging and disengaging with an improved collet, adapter or tool holder having a milling tool fixed therewithin.

FIG. 3 is a vertical section through a drilling collet, adapter or tool holder with a small diameter drill held thereby, such holder adapted to be received and removably held within the drilling shank construction of FIG. 1 in the manner that the milling tool holder is removably received and fixed in the milling shank in FIG. 2.

FIG. 4 is a considerably enlarged, fragmentary view of the left center portion of FIG. 2, such specifically showing details of the in use, completed subject engaging construction and assembly. (The view is taken between the lower inner end of the milling shank of FIG. 2 and the inner rim of the nut threaded on the lower outer end of the milling shank, the view detailing the forced engagement of a circular section compression spring, such being locked between the surfaces of the said nut inner lower end, the said milling shank inner lower end and the upper face of the groove in the outer essentially central portion of the milling tool holder.)

FIG. 5 is a fragmentary view taken along the line 5—5 of FIG. 4 in the direction of the arrows.

FIG. 6 is a three-fourths perspective view from above of an assembly of a Jacobs taper arbor mounting, the compression nut of the subject invention mounted (threaded) thereon, with a drilling tool holder similar to that in FIG. 3 locked in place for use in this combination of elements (before being attached to the machine tool drive spindle).

FIG. 7 is a three-quarter perspective view from below of a typical R-8 milling shank of the type partially seen in section in the upper portions of FIGS. 1 and 2, such having the compression nut threaded on the lower end thereof, but without a tool holder yet being mounted or received therewithin.

FIG. 8 is a three-fourths perspective view from below of a tool holder of the same sort seen in section in the center portion of FIG. 2, this tool holder also carrying a tool therewithin, such tool holder adapted to be received within and gripped between the R-8 milling shank seen in the upper portion of FIG. 7 (and the upper portion of FIG. 2) and the knurled compression nut construction seen both in FIG. 2 and the lower portion of FIG. 7 in the manner illustrated in FIG. 2.

FIG. 9 is a three-fourths perspective view from below of a tool holder of a different construction from that seen in FIG. 3, such tool holder useable in the drilling and milling shanks of the upper portions of FIGS. 1 and 2, respectively and also with respect to the Jacob's taper arbor mounting seen in FIG. 6.

FIG. 10 is a view like that of FIG. 4 but showing an alternatively structured engagement of the lower end of a drilling or milling shank with a tool receiving collet by means of a knurled nut and a coiled compression spring.

BRIEF DESCRIPTION OF THE INVENTION

The novelty and invention of the subject tool changing system is particularly and optimally directed to the action of a near circular compression spring received between and alternatively compressed and released by (in use or application and tool insertion, removal and change): (1) a wedging face on a first angled surface provided in the inside lower end of a milling or drilling shank, (2) another (second) angled compression or wedging surface provided by the inner lower portion of a knurled, threaded nut threadably engaging the outer lower portion of said shank and, finally, (3) a third compression surface provided by a spring receiving groove positioned intermediate the ends of a collet or tool holder received, by its upper end, in said drilling shank inner lower end. This three-way compression is seen in enlarged sectional detail in FIG. 4 and in overall smaller section in the center of FIG. 2. The helix angle of the knurled nut internal thread engaging the external thread on the lower end of the milling or drilling shank drives and powers this three surface contacting of and compression of the said circular compression spring. FIG. 4 shows the spring at initial engagement by the three noted wedging surfaces, prior to sectional change of shape by the spring under compression.

Alternatively, the new shank tool holder engagement may involve only (2) supra and a specially configured bearing surface in (3) supra as illustrated in FIG. 10 providing the removable engagement of the shank and tool holder through a knurled nut and a compression spring.

Accordingly, approximately 32 turns, for example, of the circular compression spring wire impinge against the cited surfaces under wedging force and are thus biased into ovality (in section) by said forces, thereby forming a three (or two) sided group of wedging action surfaces, said surfaces, upon closure thereof with respect to one another, providing approximately 39 pounds force per coil of the spring. This pressure or force will not Brinell the alloy steel, heat treated, called out surfaces of (1) the knurled, internally threaded nut, (2) the externally threaded lower end of the milling or drilling shank (the interior end portion thereof), if employed, or (3) the bearing surface on the tool holder, collet or adapter. Thus there is swiftly and easily provided an excellent, cushioned, setting lock up of the three parts (shank, collet and nut) in question. Such lock up also takes up any slack between the inner and outer tapers of said surfaces as the omnipresent particles and/or films of microscopic foreign matter are flattened between said surfaces due to tool pressure. Such cushioned lockup also does away with vibration which, without the unique features to be described in more detail herebelow, could and would cause, inevitably, looseness and subsequent cutting tool chatter unless spanner wrench force of major effort is employed in the engagement (as in the Rego-Fix assembly).

The above remarks are based on the actual application of approximately 25 inch/lbs of torque to the said knurled nut solely applied by the operator's hand. This force has proven to be sufficient in actual shop useage and the same amount of hand torque in the opposite direction suffices to loosen the nut and assembly of engaging parts.

DETAILED STRUCTURE AND FUNCTION

The subject improvement involves, basically, in one preferred form thereof, four elements or members. The first of these, in a first embodiment thereof, as seen essentially in FIGS. 1-8, inclusive, as well as FIG. 9, as the top element of the assembly, is generally labeled 20. Element 20 is a universal collect chuck or at least contains the lower engaging elements thereof. Such comprises, in FIGS. 1-8, inclusive, an essentially conventional R-8 milling shank in the configuration shown and to be described, such, however, being modified in the lower inner end thereof as is seen, particularly, in FIGS. 1, 2 and 4. This change is to provide a first bearing surface to be described. FIG. 9 shows a Jacobs Taper tool for arbor mounting which involves the same internal lower structure thereof as will be described re FIGS. 1-8, inclusive.

A second member, generally designated 21, comprises a outwardly knurled, inwardly threaded nut 21 which, at its lower inward end, is so configured as to provide a second bearing surface of a certain type to be described. The third element 22 of the four in question comprises a collet, tool holder, adapter or stub shank driver which provides therein means for gripping a work tool, as well as a configured portion groove or recessed or equivalent structure intermediate the ends thereof which provides therewith or therewithin a third bearing surface to be herebelow described. Such third bearing surface cooperates with the other two preferredly present bearing surfaces provided in elements 20 and 21 as may be seen in detail in FIG. 4.

Finally, the fourth member is a coil compression spring, generally designated 23 which is received, in operation, between and in use is wedged and compressed therebetween by, the three noted bearing surfaces, specifically (1) the first such surface in the lower inner end of the milling shank, (2) the second such surface on the inward lower end of nut 21 and (3) the third in the configured recess, yet undescribed, found intermediate the ends of the tool holder 22.

FIG. 10 shows that, by configuring the third such surface in a particular manner, the presence of the first such surface is not required.

Rego Fix Catalog And Other Nomenclature

With respect to proper, conventional and useful terminology, and looking first at the prior art Rego-Fix brochure or catalog, on page 2 of such brochure, this company labels the exploded photographs disclosing the various parts of various tool holder assemblies as "Universal Collet Chucks". (However, on page 3 of the Rego Fix Brochure, the terms "universal collet chucks'-'are applied just to the 3-8 numbered upper bodies and the nuts 26 engageable therewith.) These exploded views of brochure P2 first show, at level 3-8 (the upper level), what Rego-Fix also refers to on page 7, example 5, as a "collet chuck". Thus, the wording in the brochure is not self-consistent.

On the brochure, page 2 second level, at 25a and 26, is seen what Rego-Fix, again referring to page 7, example 5, refers to as (an internally threaded) "nut". The latter is to be screwed on the "collet chuck"lower end in the view of view 5, page 7. However, on P3 of the brochure the engaged nuts and members or bodies 3-8 are also called "collet chucks". Dropping to level 3 on page 2 of the brochure, at elements numbered 27-32, these elements are referred to on page 7, example 5 as "the adapter", such adapters being fitted into the "chuck" and gripped therein by the "nut". Therebelow, on page 2 of Rego Fix, at level 28a, there are shown various tools and tool holders, some tools being on level 28a, as well as some tool holders. Then, at the lowest level of the exploded photographs, there are shown various tools which can be received in certain of the tool holders.

Looking at pages 3 and 4 of the Rego-Fix brochure, the terms "collet", "chucking tool accessories", "clamping nut", "collet adapter", "chuck arbor", "adapter", etc. are variously used.

For clarity and simplicity in terminology, in this disclosure, member 20 of this applications's drawings will be typically referred to as a chuck, a body or a milling shank (the latter in the form seen in FIGS. 1, 2 and 7). (Looking at FIG. 6, the upper member therein will be referred to as a Jacobs Taper arbor mounting, a chuck or a body.) Member 21, removably threading on the lower outside end of member 20, will be referred to as a nut, clamping nut or knurled nut. Member 22, to be removably received within the lower end of shank, etc. 20 and held therein by nut 22, will be called an adapter, tool holder or stub shank driver.

Looking at other parts of the Rego-Fix brochure, one can see use of the term "collet chuck" where a "nut and spanner" are included (page 8, for example). The term "collet" is used variously to refer to adapters, as well, see page 4, for example. In this particular application, a nut is called a nut. Tools, also, to directly work the metal, are shown (at level 28a and below on the brochure page 2) in the Rego Fix literature, as well as tool holders (level 28a) which are removably connectible to the other variously called parts and members of the entire tool assembly. This application or specification shows only in FIG. 3 and FIG. 8 extra tool holders whereby, in FIGS. 1, 2, 4 and 7, there is a shank, body or chuck 20, a nut 21, an adapter, tool holder or stub shank driver 22 with a milling tool 24 seen in FIG. 2 (FIG. 8?) and a drill member seen at 25 in FIGS. 3 and 6. It is understood that another or an extra tool holder could or may be used with members 20 and 21 to hold a tool 24 or 25 in the manner as conventionally and optionally disclosed on page 2 of the Rego-Fix brochure at level 28a. This actually is seen in FIGS. 3, 6 and 8 of this disclosure.

The Rego-Fix disclosure, solely as prior art, of the structures and nomenclature, of parts, collets, nuts, collet chucks with nuts (page 3 of the Rego-Fix brochure), etc. is incorporated herewithin, solely as background information and as giving a basis for certain terminology which may or may not be universal in the industry. Such is, however, a specific and relevant way or manner of naming devices and parts of devices in this industry of tools and tool holders. Such has been and was conventionally adapted by the Rego-Fix and can also conveniently be used with respect to the present application to give reference to the adapted and changed parts of the new disclosure with respect to the conventional prior art, including Rego Fix. Somewhat ambiguous definitions of "collet" and "chuck" are also found in standard dictionaries of greater or lesser length which may or may not jibe with the terminology of Rego-Fix or this application. Thus, for example, nut 21 could well be called a collet (collar) under such nomenclature(!).

THE SUBJECT STRUCTURE

Referring particularly to FIGS. 1, 2 and 7 initially, at 20a is seen the upper end of shank 20 which is engageable by any conventional rotary tool spindle or grab (not shown). Groove or channel 20b therein is used to fix the position of shank 20 with respect to and engaging such tool spindles. The intermediate portion 20c of shank 20 carries inwardly extending locating stub shaft members 20d therethrough. Such are positioned at the upwards base of the lower center opening of shank, body or chuck 20, to lock members 22 therein against rotation as will later be described. The lower portion 20e of shank, etc. 20 is externally threaded at 20f and has internal, upwardly tapered lower bore portion 20g, intermediate bore portion 20h and upper bore portion 20i therein. The uses of these bores may be seen particularly in FIG. 2.

It is evident from the prior art Rego-Fix disclose that (page 7, illustration 5) an upwardly tapered lower bore and an intermediate bore adaptable to engage a tool holder or stub shank driver is generally known, as well as an upper, lesser diameter bore. Applicant's engagement, however, differs from the very expensive hexagonal engagement that is employed in intermediate bore of page 7, illustration 5, of the Rego-Fix brochure.

Looking at nut 21, the outer, upper, uniform radius portion or surface 21a thereof is preferably knurled for purposes to be discussed. Nut 21 has a central internal bore of greater upper diameter at the upper end thereof which bore is internally threaded as at 21b to engage the shank 20 lower external threading 20f. The lower, inwardly extending collar portion 21c of nut 21 provides internal bearing surface 21d, to be described, as well as well portion 21e to normally receive compression spring 23 before final assemblage of the tool elements take place.

Returning to shank 20, as may perhaps best be seen in FIG. 4, the inwardly extending portion of the lower end of shank, body or chuck 20 is inclined or beveled as at 20j to provide a first bearing surface. This bevel may be continued until reaching the upwardly tapered bore portion 20g or, as is seen in FIG. 4, the floor thereof may be made radial before reaching said opening as at 20k.

Looking at adapter, tool holder or stub shank driver 22, FIGS. 2 and/or 3, such has a lower collar portion 22a, an intermediate radial portion 22b and an upper inwardly tapered portion 22c. The outer face of portion 22c is tapered or beveled to match and fit against inner, like tapered portion 20g of member, shank, body or chuck 20. At the upper end of upper body portion 22c of adapter 22, there are provided two arcuate end recesses 22d operative to receive plugs or stub shafts 20d therewithin to lock adapter 22 without rotation with respect to body 20 when this entire, being described assembly is in use. Intermediate the height of adapter 22, there is provided a preferably both upwardly and downwardly beveled groove 22e which, as seen in larger scale, in FIG. 4, has upper bearing wall or face 22e" and lower opposite beveled wall 22e'.

Dropping to portion 22a of adapter 22, a set screw 22f, per se, such received in internally threaded radial passageway 22g, may be employed (FIG. 2), the optionally hex opening driving portion thereof being 22h. Alternatively, a resilient member 22i, FIG. 3, may be employed when the tool 25 (FIG. 3) is of small diameter and lesser strength and rigidity than, say milling tool 24 of FIG. 2. Set screw 22f of FIG. 2 engages recess 24a in tool 24 to fix tool 24 with respect to adapter 22. As previously noted, the stub shanks 22d operate to fix the upper end 22c of adapter 22 with respect to shank or body 20 as to rotation.

Looking at FIG. 3, tool holder 26 is therein shown as received in axial bore 27 which has upper threaded portion 27a of lesser diameter and lower greater diameter portion 27b. Tool holder 26 has upper axial bore 26a therein which is internally threaded at its upper reduced diameter portion whereby to engage length adjustment set screw 28 received in internally threaded bore portion 27a. Threading screw 28 downwardly in view of FIG. 3 extends drill 25 in bore 26b with respect to tool holder 26 (the lower end thereof). Member 22i firmly bears against the upper portion of the shaft of drill 25 in passage 26b, driven by set screw 22f.

Function And Operation

First looking at the structure, function and operation of the devices seen in FIGS. 1–5, inclusive, it is first assumed that nut 21 is threaded on member 20 (or the equivalent thereof) so that the internally threaded nut portion 21b threadably engages the externally threaded portion 20f. As seen in FIG. 1, the nut 21 is backed off sufficiently from the threaded portion 20f of shank 20 so that spring 23, due to its natural tendency to expand and straighten out, has moved into the largest diameter, arcuate seat portion 21e. This enables the upper or inward end 22c, which is tapered (as is seen in FIGS. 2, 3 and 4) to a lesser outer diameter upwardly, may be inserted through the lower opening of nut 21 up into tapered cavity 20g. At this time, it is assumed that a tool, for example a milling tool 24 (as in FIG. 2) or a drill 25 as in FIG. 3 (also see FIGS. 6 and 8) has been fixed within the adapter 22 by engagement of a recess 24a (FIG. 2) with set screw 22f. Likewise, drill 25 has been fixedly mounted in its adjusting tool holder 26 by set screw 22f. Screw 22f and member 22i lock drill 25 in place both with respect to member 26 and member 22.

The adapter, tool holder or stub shank driver 22 is inserted far enough into the lower hollow end 20g of member 20 so that the recesses (opposed upper end recesses) 22d, when the adapter 22 is rotated in end 20g, will engage stub shafts 20d in member 20 to fix the adapter, etc. 22 with respect to member 20 so that there will be no rotation of one with respect to the other. Said otherwise, rotational drive of member 20 will forceably and rotatably drive member 22 and any tool held therewithin.

Once this insert is made, the knurled nut 21, knurled at 21a, is threaded further upwardly on outwardly threaded lower portion 20f of member 20. This, then, brings spring 23 (in the view of FIG. 1) upwardly toward the outwardly angled downward face 20j (FIG. 4 particularly), thereby permitting such to bear on the outer faces of the turns of spring 23, and thereby also bringing into action the lower portions of the inwardly tapered face 21d of the inwardly angled inside face 21d of lower nut portion 21c.

In this case, as will be seen particularly in FIG. 4, spring 23, abutting against faces 20j and 21d, moves inwardly on these faces into the lesser internal diameter groove 22e, etc. having the faces 22e, 22e' and 22e". This motion from arcuate rest 21e into the position seen in FIG. 4, where further turning of nut 21 raises spring 23 up against face 22e" of the groove in member 22, by lessening the inner diameter (and outer diameter) of the coil spring 23, causes it to extend in length. It thus can be noted, as seen in FIG. 2, on a somewhat smaller scale, and in FIG. 4 on a much larger scale, that spring 23 is captured between two opposed faces 21d and 22e" which are each approximately 45° outwardly angled from the center longitudinal axial lines of members 20 and 22 and, further, in a locating or positioning sense, also bears against the oppositely angled face 20j which, with respect to faces 21d and 22e" forms an essential right angle.

That is, looking downwardly in FIG. 4, face 20j is at a 45° angle from the elongate vertial axes of the members 20 and 22. Looking upwardly in the same view, faces 21d and 22e" are optimally angled 45° outwardly from the same axes. FIG. 4 and FIG. 2 show the spring 23 before any substantial compression is applied thereto, whereby the spring 23, in section as seen in FIGS. 2 and 4 (axial section), is still essentially round. It should be understood that surface 20J is essentially a guiding surface with faces 21d and 22e" being the force applying surfaces as the nut 21 is tightened (by hand only) on the spring 23 in further threading of member 21 on member 20.

While it is not preferred, the angled face 20j may be removed from the lower end of member 20 and bottom face 20k (at right angles to said axes) extended out to the outer periphery of the lower end of member 20. That is, then, face 20k would be at right angles to the elongate central axes of members 20 and 22. This is definitely not preferred.

It should be noted that the juxtaposition and alignment of face 20k with the upward extremity of groove face 22e" is very much preferred as such serves as a manufacturing aid in the sense that face 20k, at that Juncture, becomes a point or level to measure or gauge from. Further, it can be noted that face 22i e' is not absolutely needed either. However, it is preferred to have axial portion 22b extend upwardly close to the inward lower end of nut portion 21c' and that lower face 22e' be present in order to keep chips from the cutting, drilling or milling operations out of the spring compression zone.

What is desired is the use of a coil compression spring with, at the minimum, bearing surfaces 22e" and 21d being present with respect to members 22 and 21 as shown. In this manner, with coil spring 23 being fully extended (with coils still circular intrasverse section) as it moves from zone 21e of member 21 to the inward position of being captured between pressure applying faces 22e" and 21d, with or without guiding face 20j, enables, on further threading up of nut 21 via internal thread 20b on external thread 20f, application of further effective pressure and on and compression of spring 23 out of round. The coil spring compression by the applied bearing faces 21d and 22e" serves to lock nut 21, tool holder 22 and shank 20 with respect to one another, with the outer threaded portion 20f of member 20 and the inner slanted face 20g of member 20 bearing on the inwardly inclined face 22c of member 22.

Unthreading the nut 21 on member 20 acts in just the opposite way, specifically, as nut 21 moves downwardly with respect to member 20, "crushing" or spring deforming force is released on spring 23 (at least strong compressing force), thus automatically permitting spring 23, due to its inherent tendency to uncoil to move upwardly on face 21d in FIG. 4 until it is again seated in the spring seat 21e. At or just before this time, the spring 23 has expanded outwardly enough that member 22 can be extracted from both nut 21 and member 20 because spring 23 no longer is forced radially inwardly far enough to engage face 20e of member 22 Just above groove base 22e.

In effect, with respect to FIGS. 1–5, inclusive, spring 23, in the outwardly expanded position thereof of FIG. 1, by virtue of nut 21 being threaded upwardly in the view of FIG. 1 on upwardly threaded portion 20f of member 20 is moved downwardly on the inclined surface 21d of nut 21 and inwardly thereon until it is forced to abut face 22e", at which point (except for compression further of the spring coils) the spring 23 has moved from its largest inner diameter seen in the position of FIG. 1 to its lesser or least diameter portion or position in FIG. 4 and FIG. 2.

In the use of the device or assemblage seen in FIGS. 1–5, inclusive, where the surface 20j is present (the inwardly guiding surface for spring 23), less threading of nut 21 on member 20 is required to fix spring 23, in compression, between the bearing faces 21d and 22e" and also unthreading for release thereof. This is one good reason for providing guiding or positioning face 20j.

FIG. 10

Approximately 25 inch pounds threading force applied by the operator's hand to the knurled nut gets the desired, effective, fixing clamping pressure on compression spring 23. This clamps and locks the members 21, 20 and 22 with respect to one another so that they will not be loosened with respect to one another by vibration of the assemblage in use. To effectively clamp and lock these members with respect to one another, the spring coil must be compressed to some ovality. FIG. 5 show the forces bearing from aces 22e" and 21c on the spring coils. Preferably, the free ends of the spring do not touch one another under full compression. If this happens, the spring itself must not fully contact itself and limit movement of the spring under compression before nut 1 is fully tightened down. Said otherwise, the length of the spring must allow full compression of the spring entire length. There is no need to abut the free ends of the compression spring 23. The spring must not go solid and resist the proper compression and deformation when nut 21 is tightened down on member 20. The spring also must not fatigue or damage the surfaces upon which it bears.

Thus it is seen that there has been provided a quick change tool device operative to machine metal. It is most typically used in metal drilling and light metal milling. The adapter may be used in drill presses and drilling units. Jacobs Taper connections are standard on drill presses and chucks. This device is a tool mounting or tool holding device useable with a drilling or milling shank, Jacobs Taper arbor mounting or other adapter receiving or mounting device which enables rapid change of the chuck or tool holder with respect to said shanks, etc.

FIG. 10

FIG. 10 shows an optimum engagement structure between the compression spring 23 and surfaces 21d of member 21 and 22e" and 22e of member 22. There is no guiding surface 20j here employed as an inclined downward extension of the lower end of member 20 at 20k. In this construction, there is a radiused circumferential cavity portion 22e, 22e" quite analogous to the resting spring cavity 21e in member 21. That is, as the nut 21 is threaded upwardly on threads 20f of member 20, spring 23 moves out of resting zone 21e (fully expanded) and is moved downwardly, by combination of action of surfaces 21, 20k and 22e'into the radiused recess 22e, 22e" whereby, upon innermost positioning and greatest expansion thereof, the spring is fully received in the arcuate recess 22e and 22e".

The securing action again is like that of FIG. 4 both in locking the tool carrying adapter 22 in member 20 wherein further threading of nut 21 on threads 20f, via knurling 21a and the operator's hand, raises surface 21d, compressing spring 23 into and against the arcuate recess 22e" and 22e, thus forcing compression spring 23 first to expand and, then, to deform in tension somewhat out of pure circular shape in transverse section.

The subject device further involves the removable knurled nut 21 engaging the lower end of a Jacobs Taper member 20' (FIG. 6) for arbor mounting or a drill shank as in FIGS. 1, 2 and 7, both seen in these drawings or other equivalent power driven members carrying adapters with tools which are driveable by any known or conventional power tool mounting in rotation. What nut 21 does is, sometimes partly due to the cooperating configuration of the drilling shank or Jacobs Taper member at 20j with respect to a bearing face 22e" intermediate the length of an adapter therein is to permit the engagement of coil compression spring 23 between the lower inner portion 21d of the threaded nut and the said bearing face 22e" in the manners described. This engagement effectively yet removably fixes the adapters, stub shank drivers or the like fixedly, yet removably, by hand turning force alone on nut 21. Accordingly, in reverse, the adapter or stub shank driver 22 can be withdrawn from the loosened nut 21 and swiftly substituted for by a different tool holder. As is usual, the individual tools or secondary tool holders are fixed in the stub shank drivers, collets or changeable adapters 22 by set screws 22f.

Other quick change devices on shafts or shanks cause wobbling and require guide bushings. This device assembly is so short and rigid that it does not require guide bushings to guide the drill or the cutter. Special drill holders 22 may be employed, one for each size drilling tool 25.

The subject circular compression spring 23, as it is compressed by nut 21 being tightened on member 20, first results in the spring 23 uncoiling, extending in length and moving downwardly from nonuse storage position 21e into the compression configurations seen in FIG. 4 (with or without face 20j) or FIG. 10. The spring may strike end to end before it is locked or in lock position, but must not fully compress closed before the nut is fully tightened down. In the Rego-Fix device, if the wire ends hit before compression/extension is finished due to the action of the spanner wrench on the nut, there is no possibility of a positive attachment of the tool carrying adapter by the nut onto the lower end of the shank.

The use or necessary use of a wrench or spanner on a nut is bad in this construction. Limitation of operator hand force by the knurling grip or nut 21 permitted by the use of the expandable compression spring 23 is much better with respect to uniformity of application and release of the linked elements 20, 21 and 22 as well as preservation of the bearing faces acting on the locking element 23.

Said otherwise with respect to the above, the gap between the free ends of compression spring 23 when such is outwardly seated in recess 21e in FIG. 1 is substantial. One may compress the spring in this assembly (as the spring is moved downwardly into the compression zone (21d, 22e") seen in FIGS. 4 and 10 until the ends touch. However, the spring should not go solid when partly tightened down. That is, there must remain some gap. The length of spring 23 must allow full extension of the entire spring and then distortion of the coils somewhat into ovality.

The present use does not fatigue or damage the bearing surfaces 22e" and 21d or, for that matter, 20j. Here there is a dynamic as opposed to a static fixation as seen in Rego Fix.

Referring to FIG. 7, this view shows an outer three-fourths perspective from below of a conventional (with the exception of the added improvement described) R-8 milling shank. What is actually illustrated here is an outer perspective of the structure of FIG. 1 where the spring 23, before insertion of an adapter or tool holding collet through nut 21 and into cavity 20g in member 20, is resting in the groove or arcuate depression 21e. FIG. 8, on the other hand, shows a construction which is analogous to that in FIG. 3. That is, this is an adapter, tool holder or stub shank driver 22 holding therewithin a second tool receiving member 26 (like member 22 of FIG. 3) gripping tool 25 in a manner analogous to that in which member 26, via set screw 22f, grips drill 25. A perspective view of the critical bearing surface 22e" may be seen, as well as adjacent groove portions 22e and 22e'. The length adjuster 28 for the extension of member 25 out of collet or tool holder 26 is yet additionally seen.

By moving the adapter of FIG. 8 upwardly and to the left along its own longitudinal axis and that of member 20 of FIG. 7, in the views, results in the insertion of the adapter 22 inclined and precision ground face 22e into and against the unseen, inner, upwardly tapered surface 20g of member 20. The upper end recesses 22d, upon inserting the adapter of FIG. 8 into the shank of FIG. 7, upon rotation of the tool carrier, in member 20 enables such to snap upwardly around the subshafts 20d. At this point, the tightening of nut 21 in the manner described, whereby to move coil spring 23 inwardly on surface 21d and into bearing contact against surface 22e" is undertaken.

The structure of FIG. 6 shows the substitution of a Jacobs Taper member 20' for the mill shank 20. This is entirely conventional, except with respect to the engagement previously described. The opening 20i' serves to receive the mating Jacobs Taper driving spindle therewithin at the upper end of member 20". Adapter 22 has a set screw 22f therethrough to hold collet or secondary tool holder 26' therewithin with drill 25". The interior engaging structure of the device of FIG. 6 also is the same as FIGS. 1, 2 and 4 or FIG. 10.

FIG. 9 shows an adapter 22" having the opposed arcuate recesses 22d" operable to engage stub shanks 20d or 20d" in collet chucks 20 and 20'. The crucial bearing face 22e" is seen, as well as a lesser outer diameter portion equivalent to base 22e of FIG. 4. The lower portion of FIG. 9 is that of an adapter which has a male Jacobs Taper surface 29 for a drill chuck mounting. This shows that the face 22e' of FIG. 4 is not required or necessary and thus FIG. 9 at 22e and 22e" is somewhat analogous to the showing of FIG. 10.

Thus it is seen that applicant has provided a new combination of apparatus operative to achieve a new degree of facility and a new level of usefulness with respect to use of and replacing and removing drilling and milling adapters and tools, as well as other metal shaping devices. There is a near circular compression spring received between and alternatively compressed and released by: (1) an angled compression or wedging surface 21d provided by the lower inner portion of a knurled, theaded nut 21 threadably engaging the outer lower portion of a drill shank or Jacobs Taper mounting 20 and an opposed compression surface 22e" provided by a spring abutting and retaining groove or shelf positioned intermediate the ends of an adapter, collet or tool holder 22. The collet, tool holder or adapter 22 is received, by its tapered upper end 22c in and against an oppositely tapered drilling shank or Jacobs Taper tool inner lower end passage or recess 20g. Optionally, there may be provided, additionally, a wedging or guiding face 20g, 20k on an angled or radial surface provided in the inside lower end of a milling or drilling shank or Jacobs Taper collet chuck 20 which receives the adapter 22 therewithin and has the nut 21 threaded on the outside thereof.

The helix angle of the knurled nut internal thread engaging the external thread on the lower end of the milling shank or Jacobs Taper tool drives and powers this disclosed two surface minimum (21d, 22e") or three surface (also 20k) contacting of and compression of the said circular compression spring 23. By turning down (or up) the internally threaded nut 21 on the externally threaded lower end of the drilling shank or Jacobs Taper tool 20, approximately 32 turns, for example, the coils of the circular compression spring wire impinge against the said bearing surfaces under wedging force and are thus biased into ovality by said force.

This action forms a two (FIG. 10) sided set of wedging action surfaces or three sided such (FIG. 4), said surfaces upon closure thereof with respect to one another driven by the threading of the nut on the drill shank or Jacobs Taper tool providing approximately 39 pounds force per coil of the spring. Such a pressure or force does not brinell the alloy steel, heat treated, called out surfaces of (1) the internal portion 21d of the knurled internally threaded nut, (2) the bearing surface 22e" on the tool holder, collet or adapter, or if contacted, the outwardly shaped or faced lower inner 20k end of the milling or drilling shank or Jacobs Taper member.

In this manner, by the operators hand tightening and loosening alone, there is swiftly and easily provided an excellent, cushioned, setting lock up of the three parts in question (shank, adapter and nut). This setting or lock up also takes up any slack between the inner and outer tapers of said spring coil outer surfaces, as the omnipresent particles and/or films of microscopic foreign matter are flattened between said bearing surfaces due to tool pressure. This cushioned or resilient lock up, under tension, also does away with tool vibration which, without the unique features above described, could and would cause (inevitably) looseness and subsequent cutting tool chatter unless spanner wrench force of major effort would have employed in the engagement (as in the Rego-Fix assembly).

The above remarks are based on the actual application of approximately 25 inch pounds of torque to the said knurled nut solely applied by the operators hand. This force has proved to be efficient and sufficient in actual shop useage and the same amount of hand torque in the opposite direction suffice to loosen the nut and assembly of the engaging parts.

THE SUBJECT COMBINATION

It may be noted from comparing FIG. 6 and FIG. 7 that the Jacobs taper upper opening 20i' of FIG. 6 is adapted to receive, on the machine tool power unit, an opposite Jacobs taper insert coupled with the rotary power drive of the machine tool. The latter would be analogous to the lower portion 29 of the collet seen in FIG. 9. On the other hand, the upper drive connection portions 20a, 20b of the milling tool of FIGS. 1, 2 and 7 are engaged differently for rotary drive, that is, they are received and removably grasped by a suitable socket or engaging member coupled to the rotary power drive member or shaft of the machine tool power unit. These basic mounting and drive aspects of the two chucks shown in FIGS. 6 and 7 are entirely well known and conventional to the art and may be provided or varied in any manner, conventionally employed to removably mount any sort of chuck with respect to the machine tool powere drive shaft or member.

What is common to the disclosures made in this application may be summarized as follows. First, the subject invention is directed to apparatus for swiftly attaching and detaching (or coupling and releasing) machine tool holding parts with respect to another another.

In this combination, a chuck 20 or 20' is removably mountable on the rotary power drive member or shaft of a machine tool power unit, such mounting entirely conventional and of any conventionally effective structure and function.

The chuck 20 has upper end means thereon (such as the upper Jacobs taper block of the device of FIG. 6 or the upper engageable end portions 20a, 20b of the shank 20 in FIG. 7) for engagement by said machine tool drive system, shaft or member and a lower end construction operable to removably receive therewithin at least the upper portion of a collet 22. FIGS. 1 and 3 show a chuck 20, nut 21 and collet 22 with the latter spaced downwardly from the lower end of chuck 20 before removable insertion into the tapered recess 20g therewithin. FIG. 2 shows the engagement of the upper end portion a collet like that of FIG. 3 in the lower, hollowed out end of the chuck, this also being the case in FIGS. 4, 10 and 6.

The collet is adapted to removably carry one of a tool, per se (24 in FIG. 2) or another tool holder (or secondary collet) such as 26 in FIGS. 8 and 6. In the latter case, a tool is carried thereby as at 25 in FIG. 3, 25 in FIG. 8 and 25' in FIG. 6.

The said lower end construction of the chuck includes a central, inwardly tapered, upwardly extending, substantially frusto-conical recess as at 20g in each of FIGS. 1 and 2, also note FIGS. 4 and 10.

Said recess is adapted to removably receive at least a portion 22c of the said collet upper end or body in a close fit therein. The like tapered upper end or body of collet 22 in FIG. 3 is the same as or similar to the upwardly tapered end 22 of FIG. 2, also seen in perspective at 22c in FIG. 8.

Means are provided cooperating between an upper portion 22d of the collet body and an upper portion of the chuck lower recess 20g to removably couple said chuck and said collet for rotary movement integral with one another, with the chuck driving the collet and itself being driven by the machine tool power unit drive member (not shown). Such cooperating means are the collet upper end recesses 22d of FIGS. 2 and 3, also seen in perspective in FIGS. 8 and 9 which recesses removably engage with pins 20d only seen in FIGS. 1, 2 and 6.

There is a somewhat downwardly angled first bearing face 22e" (FIGS. 2, 3, 4, 8, 9 and 10) circumferentially formed or positioned on said collet 22 in an intermediate portion of the body thereof lying closely below that upper body portion of collet 22 which is receivable within said chuck lower end recess. FIGS. 4 and 10 are enlarged, fragmentary sectional views, showing the position of the lower edge 20k of the chuck with respect to the first bearing face 22e".

The nut 21 is threadable on the lower outer end portion of said chuck by interengagement of threaded portions 20f and 21b, as particularly seen in FIGS. 1, 2, 4 and 10. Nut 21 has a circumferentially downwardly and inwardly inclined bearing flange 21c at the lower end thereof, said flange 21c providing, on the inner surface thereof an inwardly inclined, somewhat upwardly facing, circumferential second bearing face 21d which is operable to oppose, in substantially parallel orientation, the first bearing face 22e" on the collet. Bearing face 22e" may be one face of a groove as in FIGS. 4 and 8 or just one face outwardly formed on a collet as in FIG. 9.

The two bearing faces 21d and 22e" approach one another when nut 21 is threaded upwardly on the chuck threads 20f and move away from one another when the nut is threaded downwardly on the chuck lower end. Each of the three views of FIGS. 2, 4 and 10 show the two opposed bearing faces 21d and 22e" essentially as close to each other as they get because, when the said two opposed bearing faces are driven against the coil spring 23 to achieve what is seen (the lock of the chuck, collet and nut with respect to one another) in FIG. 5, as well as the other figures mentioned, FIGS. 2, 4 and 10, the only further motion of the two bearing faces 21d and 22e" toward one another could be effected by flattening the coil compression spring 23 loops toward ovality, which event does not take place in a substantially visibly obvious manner under the hand force threading described in this specification.

Said otherwise, when nut 21 is fully threaded down (or up) on chuck 20 (threads 21b and 20f), the bearing surfaces 21d and 22e" strongly bear on opposed portions of the compression spring coils. By the time the spring is "set"between the bearing surfaces 21d and 22e" (and surface 20j if present), locking the chuck to the collet for operational use of the tool, the spring 23 has moved from the expanded position of FIGS. 1 and 7 to the tighter coiled position of FIGS. 4 and 10 (as well as 2) and the coils themselves are each in locked, fixing position against the bearing surfaces as as particularly seen in FIG. 5 and the other noted FIGS. 2, 4 and 10.

As previously noted, the coiled compression spring 23 is normally received, before tight interengagement of the four parts (chuck, collet, nut and spring), within a larger, preferably radiused, internal diameter zone 21e within said nut above said bearing face 21d. The spring 23 expanded position is well seen in FIG. 1 (also see the lower end of FIG. 7) enabling the insertion into and removal of collet 22 from the chuck lower opening 20g and into nut 21, etc. without any contact of the collet with spring 23.

The nut 21 lower inner end 21c, 21d, the chuck lower end 20k, and the collet first bearing surface 22e" are so configured that, upon threading said nut 21 upwardly on said chuck 20 after the collet 22 is received therewithin, the said coil compression spring 23 is inwardly and downwardly moved on said second bearing surface 21d whereby to be brought to strongly bear against the two, opposed, first and second bearing surfaces 22e" and 21d. What actually happens to spring 23 is that, as nut 21 is threaded upwardly on threads 20f of the chuck 20, either the chuck lower end downwardly angled projection 20j (FIGS. 1, 2 and 4) or the chuck lower flat end 20k (FIG. 10) forces the coil compression spring 23 out of the radiused recess 21e downwardly on bearing surface 21d and, also, sufficiently far downwardly that the opposite sides of the spring coils simultaneously bear against first bearing surface 22e". Where there is an inclined extension 20j as in FIGS. 1, 2 and 4, the spring will ultimately bear, as shown against three surfaces, 21d, 20j and 22e" substantially circumferentially with the greatest basic force vectors being exerted between opposed bearing faces 21d and 22e".

Where there is no projection 20J on the lower end of chuck 20, a radiused or rounded first bearing surface 22e" as seen in FIG. 10, is preferably provided. Once spring 23 is received therewithin, recess 22e", there is not required any further final contact of spring 23 by the lower end 20k of chuck 20 when the device is locked upon itself. The arrangement of FIG. 4, with the third bearing face 20j present, is much preferred as less threading action is required to seat the bearing faces 21d and 22e" against the spring coils in final locking position than is the case with respect to the construction of FIG. 10. The same is true with respect to unlocking the arrangement of the parts by backing off nut 21 on thread 20f. In the event that face 20k is taken all the way out radially, whereby to provide a lower flat end to the chuck, as in FIG. 10, removing the portion 20j of the chuck lower end with the face 22e" remaining flat and not radiused as in FIG. 10, a spring 23 will probably in most cases lie either closely adjacent the flat lower chuck end 20k or thereagainst as another bearing surface.

Whereby it may be seen that the tightening down (or up) of nut 21 on the threaded portion 20f of the lower end of chuck 20 to the limit of operator's hand tightness strongly fixes the relative positions of nut 21, chuck 20 and collet 22 with respect to one another until the nut is again backed off, downwardly in the views of the FIGS. 2, 4 and 10 to where spring 23 returns to zone 21e of nut 21 (FIGS. 1 and 7). When this is done, spring 23 returns again to the recessed zone 23 (preferably radiused) so that, as previously mentioned, the collet 22 as in FIG. 3 may be taken downwardly out of the lower end of chuck 20 and through the lower end of nut 21 without in any way being interfered with by spring 23. Thereafter, the same collet or another collet having the same bearing face configuration 22e" provided thereon may be engaged in the lower end recess of chuck 20 and nut 21 again threaded upwardly on the chuck to move inwardly and downwardly spring 23 to capture the coil compression spring between the two opposed bearing faces 21d and 22e" and, optionally, lower face 20k of chuck 20 or angled lower face 20j of the inside of the lower end of chuck 20 as seen in FIG. 4.

It should be noted with respect to the descriptive terminology of this case that, in all described cases, the longitudinal axes of chucks 20, collets 22 and nuts 21 are assumed to be all normally vertical in use, assembly and disassembly This assumed orientation enables the description of the parts to include upper, lower and intermediate portions, ends, etc. In actuality such axes may be horizontal, angled from vertical and horizontal, etc. The convention adopted in the description, then, is for the purpose of clearly and conveniently designating the elements of the assembly in orderly fashion and the parts thereof relative to one another in an accurate and consistent manner, solely.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. Apparatus for swiftly attaching and releasing machine tool holding parts with respect to one another, comprising, in combination:
    (1) a chuck removably mountable on the rotary power drive member of a machine tool power unit;
    (2) said chuck having upper means thereon for engagement by said machine tool drive member and a lower end construction thereof operable to removably receive therewithin at least an upper portion of a collet;
    (3) said collet adapted to removably carry one of a tool and another tool holder;
    (4) the said lower end collet receiving construction of said chuck including a central, inwardly tapered, upwardly extending, substantially frusto-conical recess;
    (5) said chuck recess adapted to removably receive at least a portion of the said collet upper end in a close fit therein; the lower outer end of said chuck being externally threaded to receive a nut thereon;
    (6) means cooperating between an upper portion of the collet and an upper portion of said chuck within said lower recess to removably couple said chuck and said collet for rotary movement integral with one another with the chuck driving the collet, the chuck itself being driven by the machine tool power unit drive member;
    (7) a somewhat downwardly angled first bearing face circumferentially positioned on said collet in an intermediate portion thereof said intermediate portion positioned closely below that upper portion of the collet receivable within said chuck;
    (8) a nut threadable on the lower outer end portion of said chuck;
    (9) said nut having a circumferentially inwardly inclined bearing flange at the lower end thereof, said flange providing an inwardly inclined, somewhat upwardly facing, circumferential, second bearing face operable to oppose, in substantially parallel orientation, the first bearing face on the collet when the collet is received in said chuck;
    (10) said two bearing faces approaching one another when the said nut is threaded upwardly on the chuck lower end and vice versa and
    (11) a coil compression spring normally received within a greater internal diameter zone within said nut above said second bearing face in a position normally freeing said chuck lower end recess and nut for insertion and removal of said collet upper end therethrough and therefrom;

(12) said nut lower inner end, chuck lower end and collet first bearing surface so configured that, upon threading said nut upwardly on said chuck after the collet is received therewithin, the said coil compression spring is inwardly and downwardly moved onto said second bearing surface and brought between and to strongly bear against said two opposed first and second bearing surfaces;

whereby the tightening down of said nut on said chuck lower outer end thread to the limit of hand tightness fixes the relative positions of said nut, chuck and collet with respect to one another until said nut is backed off.

2. Apparatus as in claim 1 wherein said first bearing surface on said collet is radiused to receive said coil compression spring therein without said spring necessarily contacting any portion of the lower end of the chuck when the first and second bearing surfaces are pinning the coil compression spring therebetween in fixing the chuck, collet and nut with respect to one another.

3. Apparatus as in claim 1 wherein said larger internal diameter zone within said nut above said second bearing face operative to receive said coil compression spring therewithin is radiused, whereby to normally fixedly receive said spring therewithin until the nut is tightened down on the threaded lower end of the chuck whereby the spring is forced inwardly and downwardly into position between said first and second bearing surfaces.

4. Apparatus as in claim 1 wherein the lower end of said chuck extends downwardly far enough with respect to said first collet bearing face so as to cooperate in moving said coil compression spring from its normally occupied larger internal diameter zone in said nut downwardly between said first and second opposed bearing faces on the collet and nut.

5. Apparatus as in claim 4 wherein the lower end of said chuck is normally flat and extends at substantial right angles to the longitudinal axes of the nut, the chuck and the collet when they are engaged together.

6. Apparatus as in claim 1 including a downwardly angled third bearing face located at the lower end of said chuck, which bearing face extends substantially normal to said first and second bearing surfaces with respect to one another and cooperates in holding said compression spring between and against said first and second bearing surfaces as the nut is threaded further on the lower end of the chuck.

7. Apparatus for swiftly attaching and releasing machine tool holding parts with respect to one another, comprising, in combination:

(1) a chuck body removably mountable on the rotary power drive member of a machine tool power unit;

(2) said chuck body having an upper portion with upper means thereon for engagement with said machine tool drive member and a lower body portion having a lower end construction thereof operable to removably receive therewithin at least an upper portion of a collet body;

(3) a collet body having upper, intermediate and lower portions thereof and adapted to removably carry one of a tool and another tool holder;

(4) the said lower end, collet receiving portion of said chuck body including a central, inwardly tapered, upwardly extending, substantially frusto-conical recess extending into the lower end of said chuck and upwardly therein;

(5) said chuck body lower end recess adapted to removably receive at least a portion of the said collet body upper end in a close fit therein; the lower outer end portion of said chuck body being externally threaded to receive a nut thereon;

(6) means cooperating between an upper portion of the collet body and an upper portion of said chuck body within said lower recess thereof to removably couple said chuck and said collet bodies for rotary movement integral with one another with the chuck body driving the collet body, the chuck body itself being driven by the machine tool power unit drive member;

(7) a somewhat downwardly angled first bearing face circumferentially positioned on said collet body in an intermediate height portion thereof said intermediate height portion being positioned closely below that upper portion of the collet body receivable within said chuck body;

(8) a nut threadable on the lower outer end portion of said chuck body;

(9) said nut having a circumferentially inwardly inclined bearing flange at the lower end thereof, said flange providing an inwardly inclined, somewhat upwardly facing, circumferential, second bearing face operable to oppose, in substantially parallel orientation, the first bearing face on the collet body when the collet body is received in said chuck body;

(10) said two bearing faces approaching one another when the said nut is threaded upwardly on the chuck body lower end and vice versa and

(11) a coil compression spring normally received within a greater internal diameter zone within said nut above said second bearing face therewithin in a position normally freeing said chuck body lower end recess and nut passage for insertion and removal of said collet body upper end therethrough and therefrom;

(12) said nut lower inner end, chuck body lower end and collet body first bearing surface so configured that, upon threading said nut upwardly on said chuck body after the collet body portion is received therewithin, the said coil compression spring is first inwardly and downwardly moved onto said second bearing surface and then brought between and to strongly bear against said two opposed first and second bearing surfaces;

whereby the tightening down of said nut on said chuck body lower outer end thread to the essential limit of hand tightness fixes the relative positions of said nut, chuck body and collet body with respect to one another until said nut is backed off.

8. Apparatus as in claim 7 wherein said first bearing surface on said collet body is radiused to receive said coil compression spring therein without said spring necessarily contacting any portion of the lower end of the chuck body when the first and second bearing surfaces are pinning the coil compression spring therebetween in fixing the chuck, collet and nut with respect to one another.

9. Apparatus as in claim 7 wherein said larger internal diameter zone within said nut, above said second bearing face therewithin, operative to receive said coil compression spring therewithin is radiused, whereby to normally fixedly receive said spring therewithin until the nut is tightened down on the threaded lower end of the chuck body whereby the said spring is forced inwardly and downwardly into engaging and locking position between said first and second bearing surfaces.

10. Apparatus as in claim 7 wherein the lowermost end of said chuck body extends downwardly far enough with respect to said collet body first bearing face so as to cooperate in moving said coil compression spring from its normally occupied larger internal diameter zone in said nut downwardly between said first and second opposed bearing faces on the collet body and nut.

11. Apparatus as in claim 10 wherein the lower end of said chuck body is normally flat and extends at substantial right angles to the longitudinal axes of the nut, the chuck body and the collet body when they are engaged together.

12. Apparatus as in claim 7 including a downwardly angled third bearing face located at the lower end of said chuck body, which third bearing face extends circumferentially substantially normal to both of said first and second bearing surfaces and cooperates in holding said compression spring between and against said first and second bearing surfaces as the nut is threaded further on the lower end of the chuck body.

* * * * *